United States Patent
Maurice et al.

(10) Patent No.: US 10,124,520 B2
(45) Date of Patent: Nov. 13, 2018

(54) TUBE THAT UTILIZES THE PROPERTIES OF THE SKIRT FOR THE TUBE ENDPIECE

(71) Applicant: ALBEA SERVICES, Gennevilliers (FR)

(72) Inventors: Thierry Maurice, Châlons-en-Champagne (FR); Eric Kerman, Châlons-en-Champagne (FR); Jean-Claude Jammet, Amiens (FR); Etienne Hermant, Châlons-en-Champagne (FR)

(73) Assignee: ALBEA SERVICES, Gennevilliers (FR)

( * ) Notice: Subject to any disclaimer, the term of this patent is extended or adjusted under 35 U.S.C. 154(b) by 346 days.

(21) Appl. No.: 14/652,281

(22) PCT Filed: Dec. 18, 2013

(86) PCT No.: PCT/EP2013/077175
§ 371 (c)(1),
(2) Date: Jun. 15, 2015

(87) PCT Pub. No.: WO2014/096056
PCT Pub. Date: Jun. 26, 2014

(65) Prior Publication Data
US 2015/0344191 A1    Dec. 3, 2015

(30) Foreign Application Priority Data
Dec. 21, 2012   (FR) ...................................... 12 62732

(51) Int. Cl.
*B65D 35/00* (2006.01)
*B29C 45/14* (2006.01)
(Continued)

(52) U.S. Cl.
CPC .. *B29C 45/14598* (2013.01); *B29C 45/14008* (2013.01); *B29C 45/14221* (2013.01);
(Continued)

(58) Field of Classification Search
CPC ........ B65D 35/00; B65D 35/10; B65D 35/12; B65D 35/14; B29D 23/20
See application file for complete search history.

(56) References Cited

U.S. PATENT DOCUMENTS 2,352,384 A * 6/1944 Hoch ..................... B65D 35/10
                                                                      222/92
2,401,784 A * 6/1946 Zahara ................... B65D 35/10
                                                                      222/107
(Continued)

FOREIGN PATENT DOCUMENTS

| GB | 1445609 A | 8/1976 |
|---|---|---|
| GB | 2098917 A | 12/1982 |
| JP | S61-103336 U | 7/1986 |

OTHER PUBLICATIONS

Feb. 28, 2014—Written Opinion—PCT/EP2013/077175.
Feb. 28, 2014—International Search Report—PCT/EP2013/077175.

*Primary Examiner* — Andrew T Kirsch
*Assistant Examiner* — Don M Anderson
(74) *Attorney, Agent, or Firm* — Banner & Witcoff, Ltd.

(57) ABSTRACT

The present invention relates to a flexible tube for a product having a liquid or pasty consistency, comprising:
a tube head (1) comprising a shoulder (12) and a neck (11),
a skirt (2) having a proximal end (21) which is connected to the tube head (1) and a free distal end (22), the skirt (2) forming an internal volume which is adapted to contain a product having a liquid or pasty consistency, characterized in that the proximal end (21) of said skirt (2) comprises a plurality of flaps (24) and a plurality of notches
(Continued)

(23) separating said flaps (24), said flaps (24) being folded so as to cover all or part of the shoulder (12).

7 Claims, 5 Drawing Sheets

(51) Int. Cl.
*B65D 35/10* (2006.01)
*B65D 35/12* (2006.01)
*B29L 23/20* (2006.01)
*B29D 23/20* (2006.01)

(52) U.S. Cl.
CPC ............. *B65D 35/00* (2013.01); *B65D 35/10* (2013.01); *B65D 35/12* (2013.01); *B29D 23/20* (2013.01); *B29L 2023/20* (2013.01)

(56) References Cited

U.S. PATENT DOCUMENTS

| | | | | |
|---|---|---|---|---|
| 3,260,411 | A * | 7/1966 | Dobson | B65D 35/12 222/107 |
| 6,846,443 | B1 * | 1/2005 | Jackson | B29C 45/0046 264/242 |
| 8,383,215 | B2 * | 2/2013 | Shi | B65D 35/12 428/34.1 |

* cited by examiner

FIG. 5
FIG. 6
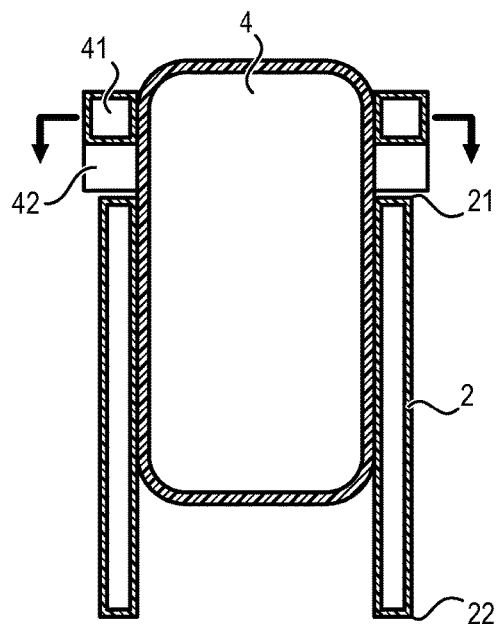
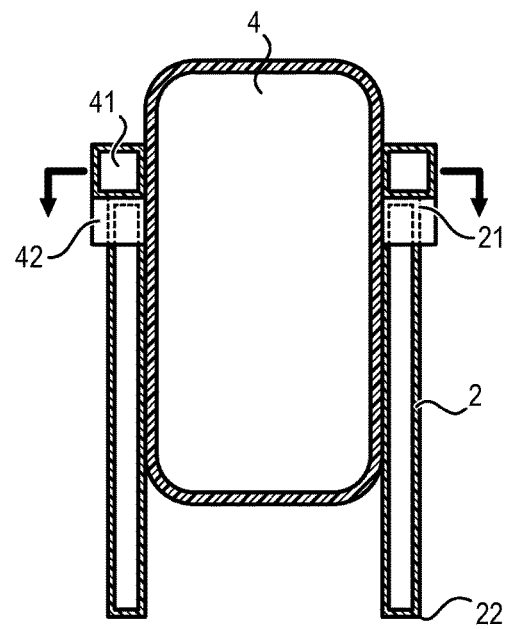
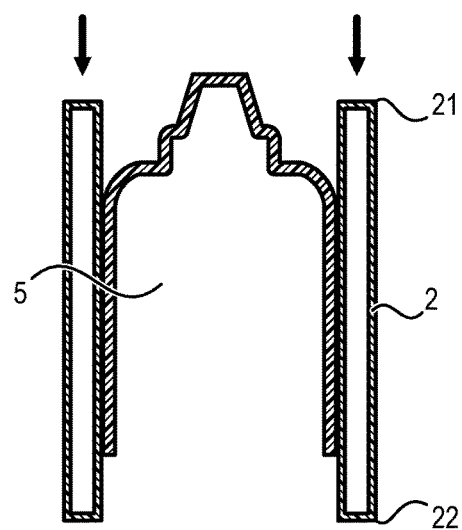

TUBE THAT UTILIZES THE PROPERTIES OF THE SKIRT FOR THE TUBE ENDPIECE

CROSS-REFERENCE TO RELATED APPLICATIONS

The present application is a U.S. National Phase filing of International Application No. PCT/EP2013/077175, filed on Dec. 18, 2013, designating the United States of America and claiming priority to French Patent Application No. 1262732 filed Dec. 21, 2012. The present application claims priority to and the benefit of all the above-identified applications, which are all incorporated by reference herein in their entireties.

GENERAL TECHNICAL FIELD

The present invention relates to the field of flexible tubes for storing and dispensing products having a liquid or pasty consistency, and to the methods for manufacturing such tubes.

PRIOR ART

Flexible tubes are commonly formed by a tube head connected to a skirt, the tube head comprising a neck for removing a product contained in the tube, whereas the skirt forms the internal volume of the tube which is adapted to receive a product. The skirt is conventionally formed by a multi-layer sheet adapted to have satisfactory mechanical strength and sealing properties.

The tube head is, however, usually produced by plastics injection moulding, which may prove unsatisfactory for certain applications owing to the very aggressive nature of certain products.

To address this problem, several solutions have been proposed, including in particular an insert comprising a metal or EVOH barrier layer, which is shaped to the inner face of the shoulder of the tube head, so as to form a barrier separating the tube head itself from the product contained in the tube and thus to protect said tube head.

However, although such an insert contributes to improving the properties of the tube head, said head has several regions having weaker properties, in particular at the edge of the insert.

DESCRIPTION OF THE INVENTION

The problem addressed by the present invention is that of proposing a tube which does not have such drawbacks.

For this purpose, the present invention proposes a flexible tube for a product having a liquid or pasty consistency, comprising:
  a tube head comprising a shoulder and a neck,
  a skirt having a proximal end which is connected to the tube head and a free distal end, the skirt forming an internal volume which is adapted to contain the product having a liquid or pasty consistency,
characterised in that the proximal end of said skirt comprises a plurality of flaps and a plurality of notches separating said flaps, said flaps being folded so as to cover all or part of the shoulder.

"Cover" or "covering" means covering the tube head on the outside. In other words, the flaps are positioned on an outer face of said tube head.

The present invention thus makes it possible to exploit the properties of the skirt in order to improve the mechanical properties of the tube head, and in particular the barrier effect thereof for protecting the product contained in the tube.

According to a particular embodiment, said flaps are folded so as to cover at least 50% of the shoulder of the tube head.

According to a particular embodiment, said folded flaps extend over the entire height of the neck.

According to a particular embodiment, the tube head further comprises an insert which is arranged so as to rest against the shoulder, so as to form a barrier between the tube head and a product contained in the internal volume defined by the skirt. In other words, the insert is arranged on an inner face of said tube head, opposite said outer face which is provided with flaps.

The invention also relates to a method for manufacturing a tube for a product having a liquid or pasty consistency, wherein
  a skirt forming a cylinder of revolution is positioned around a threader, said skirt having a proximal end and a distal end,
  the skirt is slid along said threader by means of movable stops provided with a plurality of cutting tools, so as to produce a plurality of notches from the proximal end of the skirt, thus defining a plurality of flaps at the proximal end of the skirt, and so as to fit the skirt around a punch;
  a die is positioned around said punch, the die forming a recess together with the punch which defines a shape of tube head, comprising a shoulder and a neck, said die folding the flaps of the skirt such that they are shaped to the die over all or part of the recess defining the shoulder;
  plastics material is injected into said recess so as to form the tube head.

According to a particular embodiment, an insert is positioned on the punch prior to the injection of plastics material.

DESCRIPTION OF THE DRAWINGS

Other features, aims and advantages of the invention will become clearer from the following description, which is given purely by way of illustrative and non-limiting example and should be read with reference to the accompanying drawings, in which:
FIGS. 5, 6, 7 and 8 show an example of a tool for producing such a tube, and an example of the method for producing such a tube.

DETAILED DESCRIPTION

Figure 1:
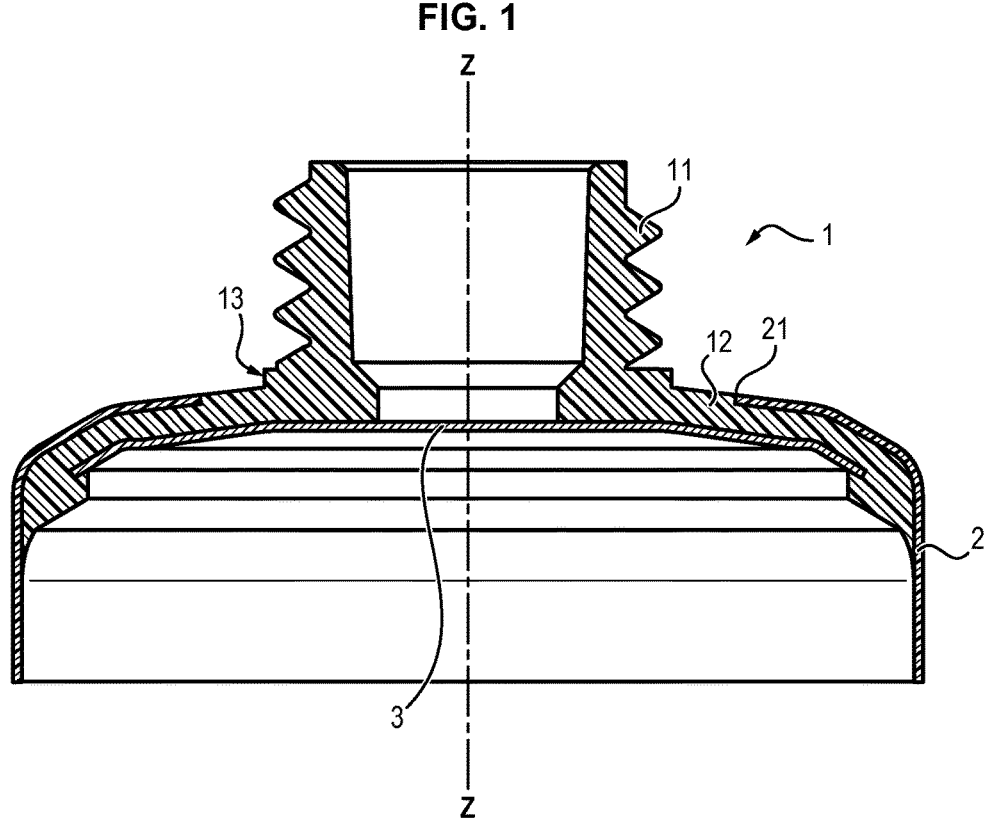
FIGS. 1 and 2 show partial views of a tube according to one aspect of the invention.
Figure 2:
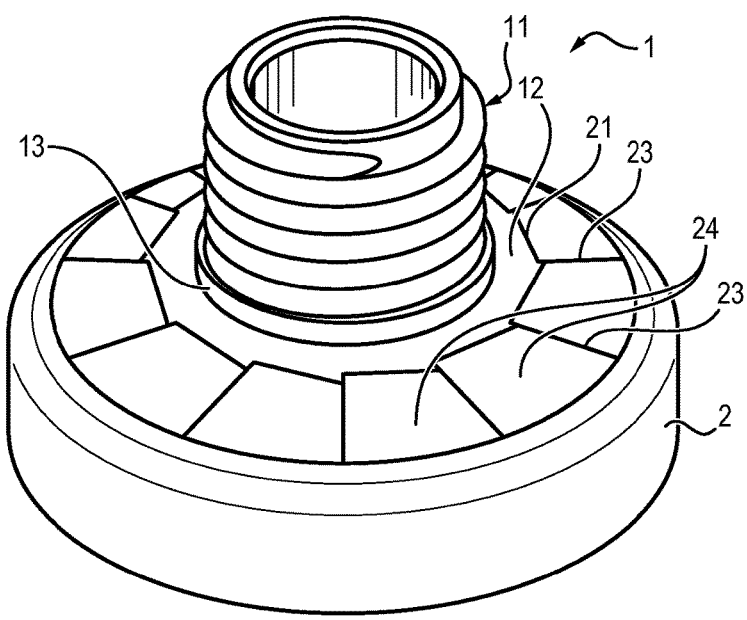

FIGS. 1 and 2 are partial views of a tube according to one aspect of the invention, comprising
  a tube head 1,
  a skirt 2 and
  an optional insert 3.

The tube head 1 comprises a neck 11 which defines a longitudinal axis Z-Z and a shoulder 12 which extends substantially radially from the neck 11.

A base 13 of the neck 11 is thus defined, which corresponds substantially to the connection between the neck 11 which has a generally cylindrical shape of revolution about the axis Z-Z and the shoulder 12 which extends substantially radially with respect to the axis Z-Z from the neck 11.

The neck 11 comprises a thread 14 over the outer periphery thereof which is adapted to allow a cap which comprises a complementary thread to be screwed onto the neck 11.

The skirt 2 is connected to the shoulder 12 so as to extend from the periphery thereof and to form an internal volume of the tube which is adapted to receive a product having a liquid or pasty consistency.

The tube as shown further comprises an insert 3 which is arranged so as to rest against the shoulder 12, against an inner surface of the shoulder 12, so as to form a barrier between the tube head and a product contained in the internal volume. The insert 3 as shown is solid, and thus forms an inner seal which blocks the neck 11. This may be an insert comprising a barrier layer, which is covered with one or more protective layers, in particular made of polymerised materials. The barrier layer may be made of metal, in particular of aluminium, or made of EVOH.

As shown in FIG. 2, the skirt 2 has a proximal end 21 which is folded onto an outer surface of the shoulder 12 and, more generally, onto an outer surface of the tube head 1. In order to allow such a fold to be made without producing ripples in the region of this proximal end 21 of the skirt 2, said skirt has a plurality of notches 23 which thus define a plurality of flaps 24 which are folded onto the shoulder 12 of the tube head 1.

The flaps 24 which are thus formed cover all or part of the shoulder 12, typically at least 50% of the surface of the shoulder 12.

Figure 9:
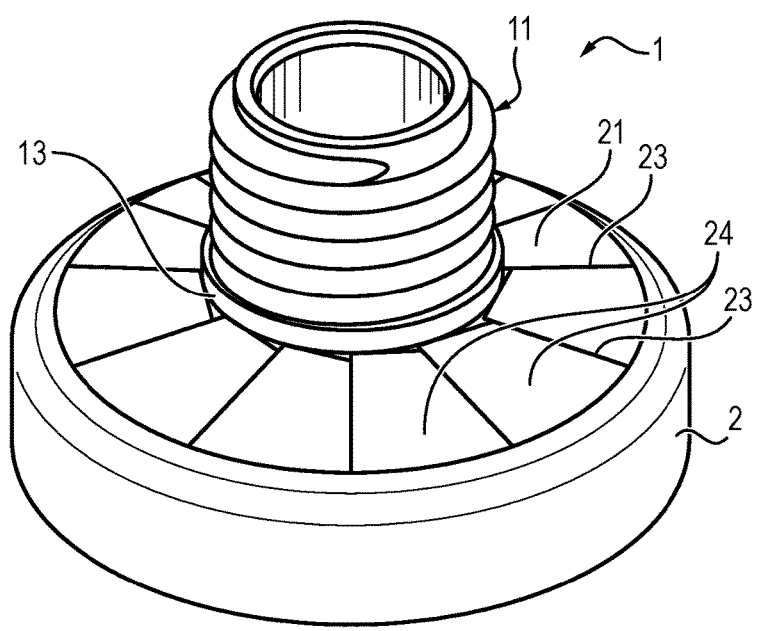
FIG. 9 shows a partial view of a tube according to another aspect of the invention;
  In all the drawings, common elements are provided with identical reference numerals.

According to a particular embodiment shown in FIG. 9, the flaps 24 are dimensioned so as to extend as far as the base of the neck 12, and therefore cover all of the shoulder 12. In a variant, the flaps 24 can also extend over all or part of the neck 11.

Figure 3:
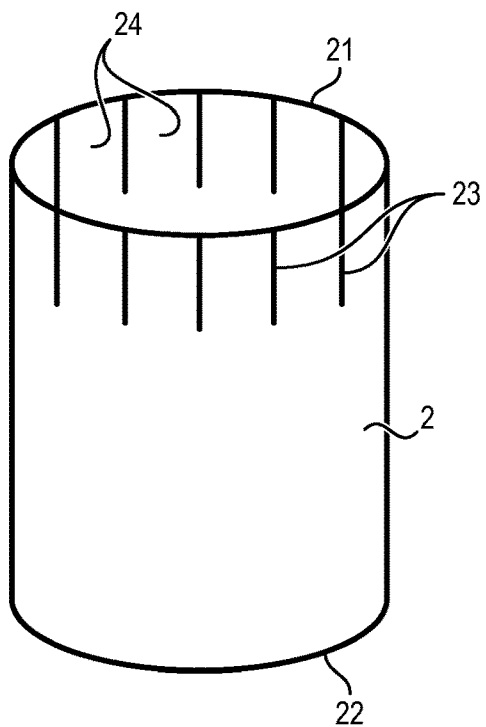
FIGS. 3 and 4 show two views of an embodiment of a skirt of such a tube.
Figure 4:
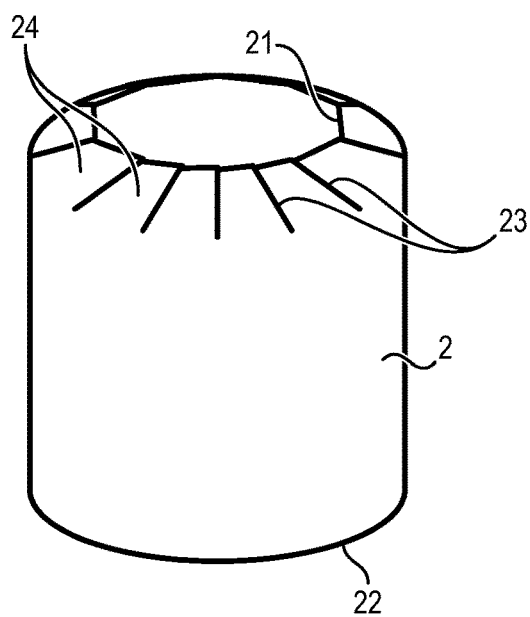

FIGS. 3 and 4 show two views of an embodiment of a skirt 2 as presented above.

The skirt 2 forms a cylinder of revolution, and has a proximal end 21 and a distal end 22.

The proximal end 21 has a plurality of notches 23 as presented above, these notches 23 thus defining a plurality of flaps 24 therebetween which are formed in the material of the skirt 2.

In the embodiment shown, the notches 23 are cuts which are made from the proximal end 21 of the skirt 2, substantially perpendicularly to said proximal end 21, each of the notches 23 advantageously having an identical length, and the notches 23 are advantageously distributed regularly along the proximal end 21 of the skirt 2. The notches 23 typically extend in parallel with the axis Z-Z, which corresponds to an axis of revolution of the skirt 2.

The flaps 24 which are thus formed are therefore similar or identical.

FIG. 4 schematically shows the folded flaps 24 in a position corresponding substantially to the configuration of the flaps shown in FIG. 2. In this configuration, the flaps 24 form a non-zero angle with the remainder of the skirt 2.

It can be seen from this figure that the adjacent flaps cover one another in part owing to the reduction in diameter between the diameter of the cylinder of revolution of the skirt as shown in FIG. 3 and the internal diameter of the reduced cross section which is defined once the flaps 24 are folded.

It is clear that in the absence of the notches 23 made in the skirt 2, the fold in the proximal end 21 thereof would lead to ripples and therefore to an irregular surface, degrading the appearance of the attached tube head as well as the mechanical properties thereof due to the irregular shape of the skirt which causes uncontrolled injection of the material forming the tube head 1.

The length of the notches 23 determines the dimensions of the flaps 24, and therefore the shoulder 12 can be covered; longer notches 23 allow a greater surface area of the shoulder 12 to be covered while preventing ripples in the skirt 12. By contrast, the lower the dimensions of the notches 23, the lower the surface area of the shoulder 12 which can be covered by folding the skirt 2.

It is also clear that the number of notches 23 also influences the possibility of folding the proximal end 21 of the skirt 2 without forming ripples; the higher the number of notches 23, the lower the dimensions of the flaps 24, and therefore the more possible it is to fold said flaps towards the inside of the skirt 2 as shown in FIG. 4 without forming ripples.

The notches 23 may also be produced in several ways. They may be simple cuts without removing material as shown in FIG. 3, or cuts involving removal of material, for example a portion having a triangular shape of which the base is formed by the proximal end 21 of the skirt 2, the shape of such cuts being configured depending on the dimensions of the skirt 2 and of the tube head 1, and of the covering by the skirt 2 which is sought.

By way of example, the following non-limiting variants are given:
  the diameter of the skirt 2 may range between 19 and 50 mm,
  for a skirt 2 having a diameter of 25 mm, the number of notches may range between 12 and 32 notches,
  the width of the notches in the region of the proximal end of the skirt typically ranges between 2 mm and 6 mm,
  the covering is typically between 0.2 mm and 1 mm.

FIGS. 5, 6, 7 and 8 show an example of a tool for producing such a tube, and an example of the method for producing such a tube.

FIG. 5 shows a skirt 2 which is mounted on a tool element which is usually referred to as a threader 4. This threader 4 has, for example, a cylindrical shape of revolution such that it is possible to fit the skirt 2 around it, and comprises movable stops 41 which can be moved along the length thereof, such that during the movement of said stops, they slide the skirt 2 along the threader 4.

Said movable stops 41 are further provided with cutting tools 42 which are distributed over the periphery of the threader 41, such that during the movement of the movable stops 41 along the threader 4, the cutting tools 42 will firstly come into contact with the skirt 2, and will then produce notches in the proximal end 21 thereof. Once said notches are made and the flaps are formed as described above, said notches abut the movable stops, which thus cause the skirt 2 to move along the threader 4.

FIG. 6 thus shows the position of the movable stops 41 once the notches are made in the proximal end 21 of the skirt 2; the movable stops push the skirt 2 so as to make it fit around a punch 5.

Figure 7:
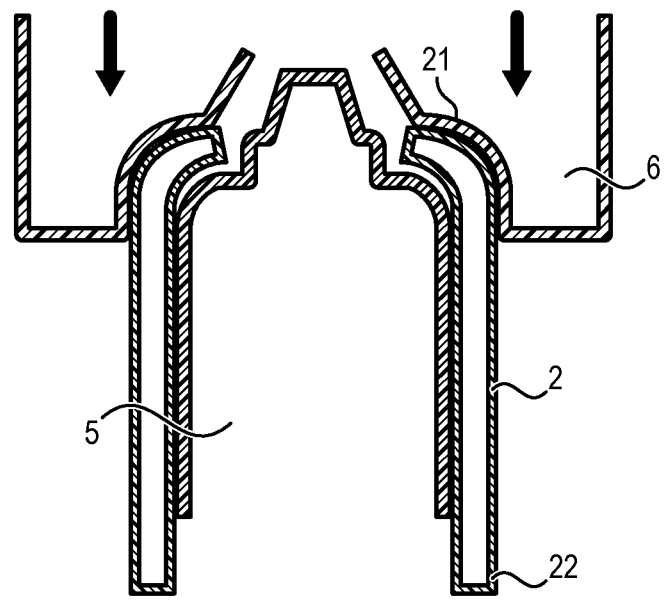
Figure 8:
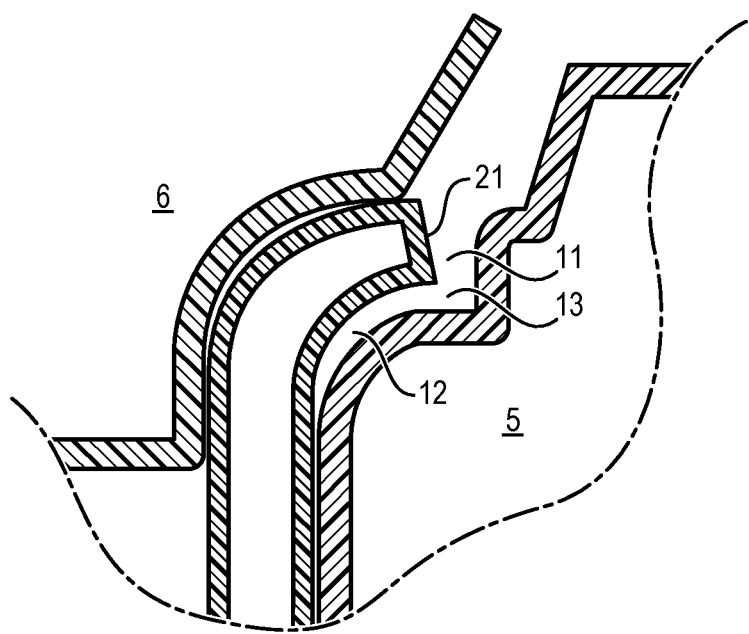

FIGS. 7 and 8 show the position of a die 6 relative to the punch 5, the die 6 and the punch 5 defining an internal volume therebetween which defines the shape of the tube head that is intended to be produced; FIG. 8 thus shows the shape of the shoulder 12 and the neck 11 of a tube head as defined above.

As shown in the drawings, the positioning of the die 6 causes the folding of the proximal end 21 of the skirt 2, such that it is substantially shaped to the shape of the die 6 which defines the shoulder 12 and, if necessary, the neck 11.

Plastics material is then injected to form the tube head in the internal volume which is defined by the punch 5 and the die 6. The plastics material thus injected will then become connected to the skirt 2, ensuring cohesion between the skirt 2 and the tube head 1.

In a variant, an insert 3 is positioned on the punch 5 before the skirt 2 is positioned or before the die 6 is positioned, thus allowing the tube head 1 to become connected to the insert 3 during the manufacturing thereof.

The present invention thus makes it possible to exploit the properties of the skirt 2 in order to improve the mechanical properties of the tube head 1.

Furthermore, in the case of a tube head 1 comprising an insert 3, the invention makes it possible to improve the properties of the tube head 1 by significantly reducing the permeability at the edge of the insert 3.

The invention claimed is:

1. A flexible tube for a product having a liquid or pasty consistency, comprising:
   a tube head comprising a shoulder and a neck,
   a skirt having a proximal end which is connected to the tube head and a free distal end, the skirt forming an internal volume which is adapted to contain a product having a liquid or pasty consistency,
   characterised in that the proximal end of said skirt comprises a plurality of flaps and a plurality of notches separating said flaps, said flaps being folded so as to cover all or part of an outer surface of the shoulder, the skirt forming a cylinder of revolution, the plurality of notches comprising between 12 and 32 notches, and the flaps all having the same shape.

2. Tube according to claim 1, wherein said flaps are folded so as to cover at least 50% of the outer surface of the shoulder of the tube head.

3. Tube according to claim 2, wherein said flaps are folded so as to cover all of the outer surface of the shoulder of the tube head.

4. Tube according to claim 2, wherein the tube head further comprises an insert which is arranged so as to rest against the shoulder, so as to form a barrier between the tube head and a product contained in the internal volume defined by the skirt.

5. Tube according to claim 1, wherein said flaps are folded so as to cover all of the outer surface of the shoulder of the tube head.

6. Tube according to claim 5, wherein the tube head further comprises an insert which is arranged so as to rest against the shoulder, so as to form a barrier between the tube head and a product contained in the internal volume defined by the skirt.

7. Tube according to claim 1, wherein the tube head further comprises an insert which is arranged so as to rest against the shoulder, so as to form a barrier between the tube head and a product contained in the internal volume defined by the skirt.

* * * * *